United States Patent [19]

George

[11] Patent Number: 4,733,324

[45] Date of Patent: Mar. 22, 1988

[54] SURGE ARRESTOR

[75] Inventor: Kenneth D. George, Bluffton, Ind.

[73] Assignee: Franklin Electric Co., Inc., Bluffton, Ind.

[21] Appl. No.: 34,700

[22] Filed: Apr. 6, 1987

[51] Int. Cl.[4] .......... H02H 9/04

[52] U.S. Cl. .......... 361/118; 361/58; 361/120; 361/129; 361/130; 200/61.45 K; 200/DIG. 29

[58] Field of Search .......... 361/2, 11, 23, 54, 56, 361/58, 88, 91, 117, 118, 120, 121, 128, 127, 126, 130, 131, 105, 103, 129; 200/61.45 R, 61.52, DIG. 29; 307/118

[56] References Cited

U.S. PATENT DOCUMENTS

| | | | |
|---|---|---|---|
| 1,222,461 | 4/1917 | Pierson et al. | 361/131 |
| 2,110,536 | 3/1938 | Swart . | |
| 3,263,117 | 7/1966 | Nilsson . | |
| 3,489,949 | 1/1970 | Carpenter . | |
| 3,849,704 | 11/1974 | Streater . | |
| 3,889,774 | 6/1975 | Schwenk . | |
| 3,912,965 | 10/1975 | Yamada . | |
| 3,983,407 | 9/1976 | Shott | 361/58 X |
| 4,298,815 | 11/1981 | Ishihara . | |

FOREIGN PATENT DOCUMENTS

| | | | |
|---|---|---|---|
| 253891 | 3/1970 | U.S.S.R. | 200/DIG. 29 |

*Primary Examiner*—A. D. Pellinen
*Assistant Examiner*—Todd E. DeBoer
*Attorney, Agent, or Firm*—Marshall,O'Toole, Gerstein, Murray & Bicknell

[57] ABSTRACT

This disclosure relates to a voltage surge arrestor for use with an electric device having a component to be protected from a voltage surge. The arrestor comprises at least first and second electrodes, and a spacer connected to the electrodes and mounting the first and second electrodes in spaced relation. The electrodes have portions which are spaced relatively close to each other and form a gap therebetween, and a gravity movable member is in the space between the electrodes and movable by gravity into and out of the gap, thereby changing the voltage breakdown level in the gap. The arrestor further includes a voltage and current limiting block connected to one of the electrodes. The movable member may be electrically conductive or a dielectric member, and it may be liquid or solid.

11 Claims, 8 Drawing Figures

SURGE ARRESTOR

FIELD AND BACKGROUND OF THE INVENTION

This invention relates to a voltage surge arrestor, and more particularly to an arrestor having two operating voltage levels.

Surge arrestors are designed to shunt a voltage surge appearing on an electric lead to ground and thereby protect an electric component connected to the lead from damage. Arrestors of this nature are well known and are particularly useful with submersible motors for pumping ground water. As described in the Streater U.S. Pat. No. 3,849,704, such a motor is well grounded by the well water and it could be damaged by a voltage surge on a power lead due to lightning. Damage would normally require removal of the motor from the well and installation of another motor, which are expensive operations as well as an inconvenience to the user.

The above Streater patent shows a construction wherein surge arrestors are mounted within the interior of a motor housing or shell. This is an advantageous arrangement because the motor manufacturer may ensure that an arrestor of the proper design is provided. Further, an arrestor within a motor provides more effective protection than one connected to a motor by a long lead.

A difficulty arises, however, when an internal arrestor is provided within a sealed motor, and the motor must undergo high-voltage insulation tests before use. For example, motor standards require that the motor insulation be able to withstand a specified high voltage (such as 1,000 plus twice the rated RMS voltage) for a specified time (such as one minute). This voltage is between the motor frame and the stator windings and is designed to test the effectiveness of the motor insulation.

At the same time, the desired breakdown voltage for a surge arrestor is in the range of 150 to 250% of the rated RMS voltage, which is considerably lower than the voltage specified for the insulation test. It will be apparent that a motor equipped with an internal arrestor at this voltage rating could not be tested at the higher voltage for the insulation test because the surge arrestor would break down and prevent the higher voltage from being attained. This problem has been an obstacle to the use of permanently connected internal arrestors in sealed motors.

It is a general object of this invention to overcome the foregoing problem by providing an arrestor that has two voltage levels, one for the insulation test and one for normal operation.

SUMMARY OF THIS INVENTION

A surge arrestor in accordance with this invention comprises at least first and second electrodes, spacer means connected to said electrodes and mounting said first and second electrodes in spaced relation, said electrodes having portions which are spaced relatively close to each other and form a gap therebetween, and gravity movable means in said space between said electrodes and movable by gravity into and out of said gap and thereby changing the voltage breakdown level in said gap. The arrestor further comprises a voltage and current limiting valve block connected to one of the electrodes. The movable means may be liquid or solid, electrically conductive or have a high dielectric strength.

BRIEF DESCRIPTION OF THE DRAWINGS

The foregoing and other objects and advantages of the present invention will become more apparent from the following detailed description taken in conjunction with the accompanying figures of the drawings, wherein.

DETAILED DESCRIPTION OF THE DRAWINGS

Figure 1:
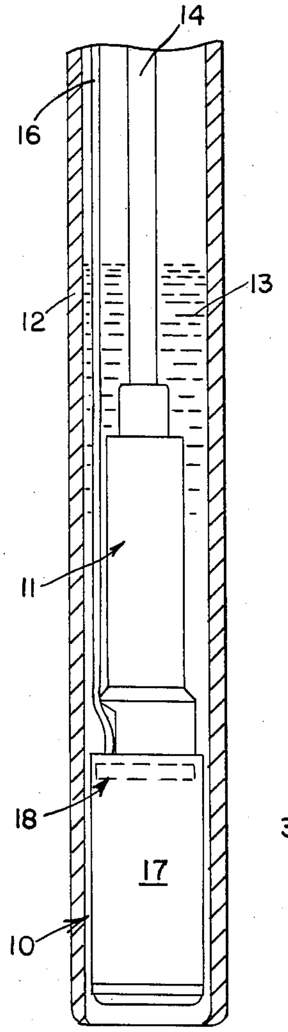
FIG. 1 is a view of a motor-pump assembly in a well, the motor including at least one arrestor in accordance with the present invention.

In the specific example of the invention illustrated and described herein, the arrestor is installed in an electric motor 10 which is coupled to drive a pump 11. The motor-pump assembly is suspended by a pipe 14 in a well borehole of a casing 12, the pump being designed to move water 13 within the well upwardly through the pipe 14 to the surface of the ground. An electric cable or power lead 16 extends from a power source (not shown) at the surface of the ground to the electric motor 10.

Figure 2:
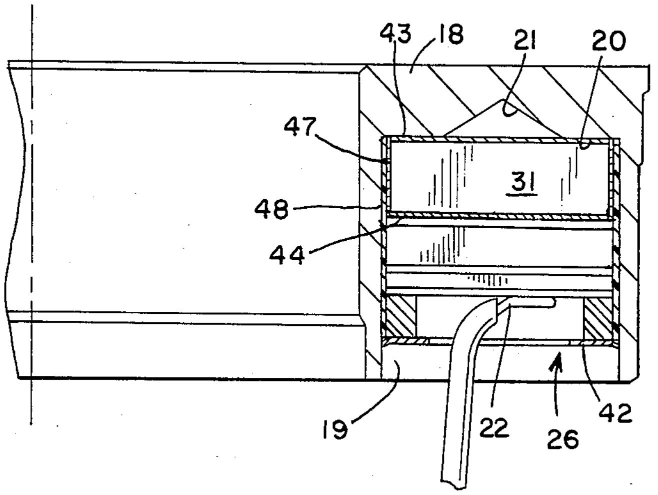
FIG. 2 is an enlarged sectional view of a part of the motor, better showing the arrestor.

The motor 10 may be of the type including an outer metal shell 17 which encloses a motor stator and a rotor. The shell 17 forms part of the housing of the motor 11 which is secured to the pump housing, and the rotor of the motor is coupled to drive the impellers of the pump 11. The motor further includes a stator within the shell including upper and lower end rings and stator windings, the windings normally being encapsulated in a potting compound. The upper end ring is indicated by the numeral 18, and it has one or more bores 19 formed in it, the bores 19 being on the side of the end ring which faces the interior of the stator cavity which contains the windings and potting compound. One bore and one surge arrestor are provided for each electrical supply line. Each bore 19 may be formed by an ordinary boring tool which forms a cylindrical main bore part and an annular flat end surface 20 (see FIG. 2) at the bottom of the bore. At the center of the flat end surface 20 may be a cone-shaped center recess 21 resulting from the normal rough drill operation before boring. As illustrated in FIG. 2, the bore 19 does not extend entirely through the end ring 18.

The power lead 16 enters the motor 10 at its upper end through a sealed connector (not shown), and the wires within the lead 16 are connected to the stator windings. With reference to FIG. 2, another wire 22 is connected between each of the wires of the power lead 16 and a lightning arrestor which is indicated generally by the numeral 26 in FIG. 2. The wire 22 may be connected directly to the lead wire or to the associated winding.

Figure 3:
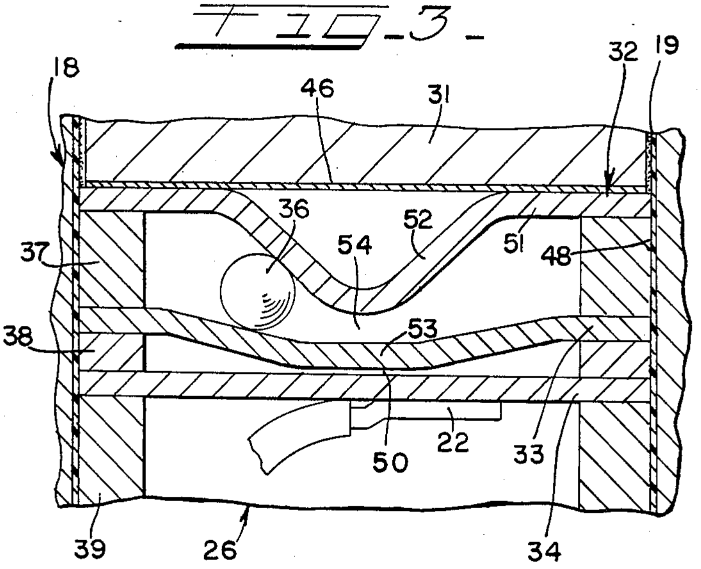
FIG. 3 is a further enlarged sectional view of the arrestor, illustrating one position of the parts.

With specific reference to FIGS. 2 and 3, the surge arrestor 26 comprises a valve block 31 which has the shape of a short round cylinder, two disk-shaped electrodes 32 and 33, a terminal plate electrode 34, and a gravity movable member 36. In addition, an annular insulating spacer 37 is mounted between the outer edges of the electrodes 32 and 33, another annular insulating spacer 38 is mounted between the outer edges of the electrodes 33 and 34, and still another annular insulating spacer 39 is positioned against the outer side of the terminal plate electrode 34. In the present instance, the foregoing parts are assembled and mounted in the bore 19 and retained therein by a retaining ring shown in FIG. 2. The retaining ring 42 is pressed into the bore 19 and its outer edges bite into the surface of the bore 19 and thereby secure the parts of the arrestor in tightly assembled relation within the bore 19.

In the present specific example, the valve block 31 is made of silicon carbide which forms a voltage dependent resistor, and the purpose of this arrangement will be described hereinafter in connection with the operation of the surge arrestor. The upper and lower (as seen in FIGS. 2 and 3) surfaces 43 and 44, respectively, of the valve block 31 are provided with a metalized coating 46. The purpose of this coating is to ensure that a good electrical connection is formed between the valve block 31 and the end ring 18 and the electrode 32. The metalized coating 46 on the upper surface 43 tightly engages the flat bottom 20 of the bore 19, and the metalized coating 46 on the lower surface 44 engages the outer peripheral area of the electrode 32. The cylindrical outer side of the valve block 31 is insulated from the end ring 18 by a ceramic coating 47 on the outer surface of the valve block 31, and by an insulating sleeve 48 which separates the bore 19 from the outer peripheries of the valve block 31, and the electrodes 32, 33 and 34. As shown in FIG. 3, the sleeve 48 also extends around the outer peripheries of the spacers 37, 38 and 39.

With specific reference to FIG. 3 which shows a cross section of the electrodes 32, 33 and 34, the outer peripheral portion 51 of the electrode 32 is flat and abuts tightly against the metalized coating 46 on the underside of the valve block 31 as previously described. The center portion 52 of the electrode 32 projects in the direction of the electrode 33 and in the present instance it forms a cone. The electrode 33 includes a flat outer peripheral part which extends between the two spacers 37 and 38, and the center portion 53 of the electrode 33 is dished downwardly away from the cone-shaped center portion 52 of the electrode 32. In the present example, the terminal plate electrode 34 is a flat disk, and the thickness of the spacer 38 is such that the terminal plate electrode 34 is spaced slightly from the center portion 53 of the electrode 33. The underside of the terminal plate electrode 34 is electrically connected to the lead or wire 22 that is also connected to the stator winding (not shown).

The movable member 36 in this example is formed by a metal ball which is loose within the space between the two electrodes 32 and 33. As shown in FIG. 3, the diameter of the ball 36 is greater than the minimum spacing between the center portions 52 and 53 of the electrodes 32 and 33, but its diameter is less than the spacing between the outer peripheral portions of the two electrodes 32 and 33. When the arrestor and the end ring 18 (and consequently the motor 10) are in the upright position shown in FIG. 3, the ball 36 moves by the force of gravity downwardly on the dish-shaped center portion 53 of the electrode 33 and rests at a position where it tightly engages the upper surface of the electrode 33 and the lower surface of the other electrode 32. It will be noted that these adjacent surfaces of the portions 52 and 53 taper downwardly and toward each other. These surfaces make an angle of about 35° which is sufficient to form electrical contact but is not so small as to tightly wedge the ball 36 between the surfaces. Consequently in this position of the parts the ball 36 forms an electrical connection between electrodes 32 and 33.

Figure 4:
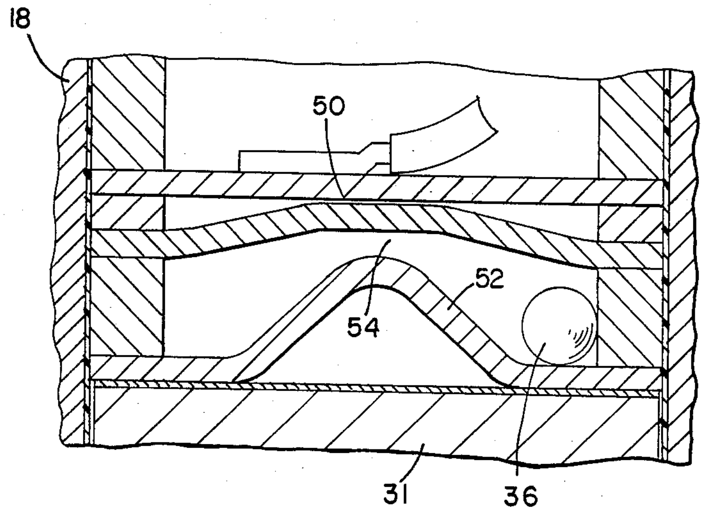
FIG. 4 is another sectional view showing a second position of the parts.

With reference to FIG. 4, when the electric motor 10 is moved to an orientation other than the vertical normal operating position shown in FIGS. 1, 2 and 3, the ball 36 moves by the force of gravity away from the position shown in FIG. 3 and moves out of engagement with at least one of the two electrodes 32 and 33. In the position shown in FIG. 4, the motor 10 is inverted end-for-end and the cone-shaped center portion 52 of the electrode 32 causes the ball 36 to roll to a corner between the outer peripheral part 51 of the electrode 32 and the spacer 37. Since the diameter of the ball 36 is less than the spacing between the electrode 32 and 33 in this area, the ball 36 is out of contact with the other electrode 33, and consequently a gap 54 is formed between the two electrodes 32 and 33. In this instance the gap 54 is located at the apex of the cone-shaped center portion 52 of the electrode 32.

The surge arrestor is constructed by forming the two electrodes 32, 33, and 34 of a suitable electrically conductive metal. The two electrodes 32 and 33 may be shaped by a pressing or other deforming operation. After the valve block 31 has been coated as previously described, the valve block, the electrodes and the spacers are assembled within the outer insulating sleeve 48 and these parts are inserted into the bore 19. The retaining ring 42 is then pressed into the outer end of the bore in order to retain the parts tightly in place within the bore.

To voltage test the insulation of the motor, the motor 10 is turned on its side or end-for-end as shown in FIG. 4. In this out-of-the-normal operating position, the ball 36 rolls to the outer side of the space and adjacent the spacer 37 where it is out of contact with at least one of the electrodes 33 and 32. The diameter of the ball 136 is such that its distance from the electrode 33 is greater than the gap 54. The effective gap of the surge arrester is then the sum of the two gaps 50 and 54 between the two electrodes 32 and 33 and between the electrodes 33 and 34, as shown in FIG. 4. The size of this effective gap and therefore the magnitude of the breakdown voltage of the surge arrester may thus be set by the shapes of the two electrodes 32 and 33 and the thickness of the spacers 37 and 38. In the specific example being described herein, the lengths of the two gaps 50 and 54 produce a voltage breakdown value higher than that required for the insulation test of the motor under consideration. For a 460 volt motor, for example, the gaps produce a breakdown value in a range above 2,500 volts RMS. This range allows testing without arrestor breakdown of the insulation between the windings and the frame to standard requirements of a one second voltage test at 1,200 volts plus 2.4 times the rated RMS voltage, or a one minute test at 1,000 volts plus twice the rated RMS voltage.

Assuming that the motor meets the foregoing insulation test without failure, the motor is then turned to the normal operating position where the end ring 31 is uppermost as shown in FIGS. 1, 2 and 3. In this position the ball 36 rolls downwardly due to gravity on the dish-shaped portion 53 of the electrode 33 and moves into electrical contact with the two electrodes 32 and 33. Since the ball 36 forms an electrical connection between the two electrodes 32 and 33, the effective gap of the arrestor is now only the smaller gap 50 between the electrodes 33 and 34. This gap is sized to produce the desired breakdown voltage which, of course, depends on the rated voltage of the motor. The lowest breakdown voltage range for normal usage of the motor is normally about 150 to 250% of the rated RMS voltage of the motor. For a 440 volt motor, the lowest breakdown voltage range of the arrestor would be between 660 and 1,100 volts, and a somewhat higher range such as 900 to 1,500 volts may be desirable to standardize parts for all motors up to 600 volt rating.

Figure 5:
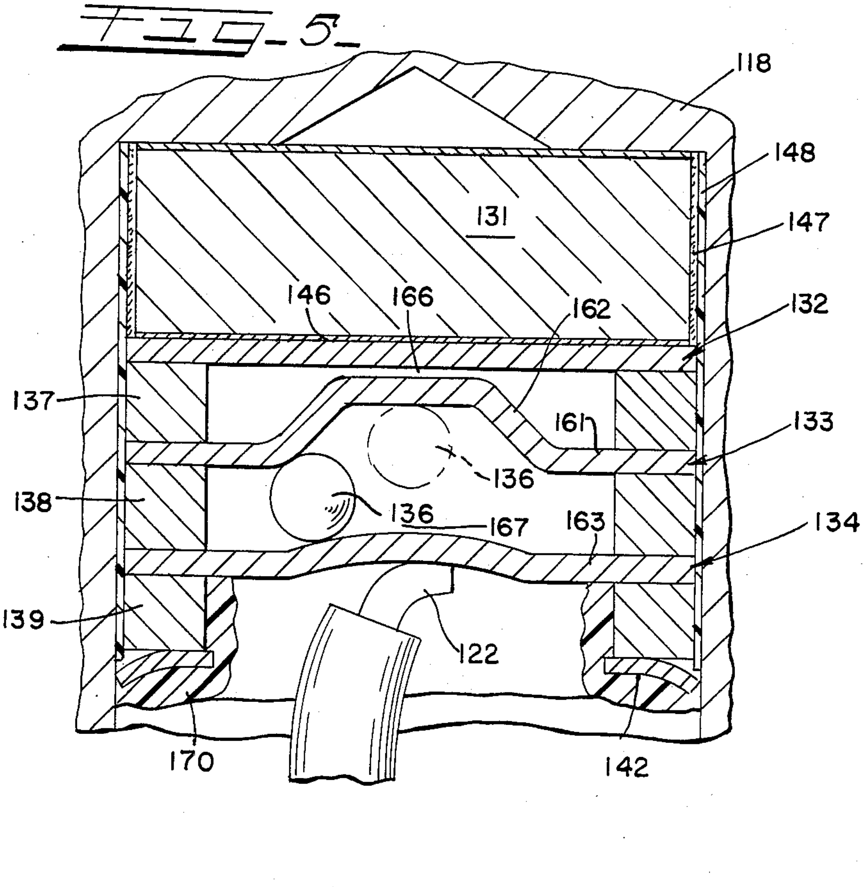
FIG. 5 is a sectional view similar to FIG. 3 but showing an alternative construction.

FIG. 5 illustrates an alternative construction of the arrestor, having components similar to those shown in FIGS. 1 to 4. In FIG. 5, the components are given the same numerals as the corresponding components in FIGS. 1 to 4 except that in FIG. 5 a value of 100 is added to the numerals of FIGS. 1 to 4. For example, the valve block 131 in FIG. 5 corresponds to the valve block 31 in FIG. 3.

The electrode 132 is a flat disk which engages the coating 146 on the underside of the valve block 131. The electrode 133 is upwardly (as seen in FIG. 5) dished and includes a flat outer portion 161 and an upwardly dished center portion 162. The terminal plate electrode 134 includes a flat outer portion 163 and an upwardly curved center portion 164. In this instance, the ball 136 is between the electrode 133 and the electrode 134.

The diameter of the ball 136 is greater than the vertical distance between the outer portions 161 and 163 but less than the vertical distance between the center portions 162 and 164. The gap 166 between the terminal plate 132 and the center portion 162 is set to produce the desired breakdown voltage during normal use of the motor and the surge arrestor.

When the motor and the surge arrestor are oriented for normal operation (as shown in FIG. 5), the curve of the center portion 164 causes the ball 136 to move radially outwardly and engage the adjacent sides of the electrode 133 and the terminal plate 134. Again a slight wedging action takes place due to the slants of the parts. The ball 136 thus forms an electrical connection between the plates 133 and 134, and the effective gap equals the gap 166. This condition also exists when the motor is turned on its side, making this alternate construction more desirable than that of FIGS. 2 to 4 if the motor will operate horizontally.

When the motor is turned upside down, the ball rolls into the space formed by the dished portion 162 and moves to approximately the position shown by the dashed lines. The ball 136 is then spaced from the electrode 134, and the minimum gap 167 is between the ball 136 and the center of the curved portion 164. The effective gap is thus the sum of the gaps 166 and 167 and is set to produce a voltage breakdown value above that used for high voltage insulation testing. The shapes of the electrodes 133 and 134, the thicknesses of the spacers, and the diameter of the ball may be adjusted to produce the desired breakdown.

During the operation of the surge arrestor shown in FIGS. 2 and 3, the upper side of the valve block 31 is connected to a ground or reference potential and the terminal plate 34 is connected by the wire 22 to an electric component or device (such as the motor winding) to be protected. The block 31 is electrically connected to the end ring 18 which in turn is electrically connected to the motor shell 17, the water 13 and the ground around the bore of the well.

When a voltage surge appears on the motor winding and the wire 22, if it is sufficiently high, an arc forms across the effective gap of the arrestor and arc current flows through the electrodes 32, 33, 34, the valve block 31 and the coatings 46 on the ends of the block to the end ring. As previously mentioned, the block 31 forms a safety valve or voltage-dependent resistor. At a high voltage level (during a surge) the block has a low resistance, and at a low voltage level (following the surge) it has a high resistance which reduces the power frequency arc current level to a relatively low value and helps to extinguish the arc. The arrestor is normally used in an AC system, and the arc is extinguished close to the next following zero crossing of the AC current wave after the surge.

It will be noted that the ball engages the two electrodes at the normal operating position; even if the ball were to stick or catch at this position, the arrestor would nevertheless be operable in the normal position, low breakdown voltage mode.

The coating 47 on the outer periphery may be a non-conductive ceramic material, and this coating plus the insulating sleeve 48 prevents an arc from forming along the side of the block or to the end ring. This is advantageous because it permits better control of the breakdown voltage. The sleeve 48 may be made of any suitable insulating material.

While a metal round ball has been shown in this specific example, other gravity movable solids or liquids could be used instead. For example, a quantity of mercury could be used, with the rest of the parts designed so it produces similar position-sensitive breakdown voltage change.

In addition to the size of the air gap, the breakdown voltage also depends on the air pressure within the arrestor. It is preferred that the air pressure be normal atmospheric pressure so that uniform breakdown values are most easily attained. This may be maintained by applying a seal material 170 (FIG. 5) between the end ring and the outside of the arrestor in order to seal the interior space. During the manufacture of the stator, a vacuum may be applied within the stator during the introduction of the stator potting compound. The seal 170 will prevent a vacuum from forming within the arrestor and it will also prevent the potting compound from entering the arrestor. An alternate method (not shown) is to seal only the joints between parts 132, 133, 134, 137 and 138, which form the same sealed gap spaces.

Figure 6:
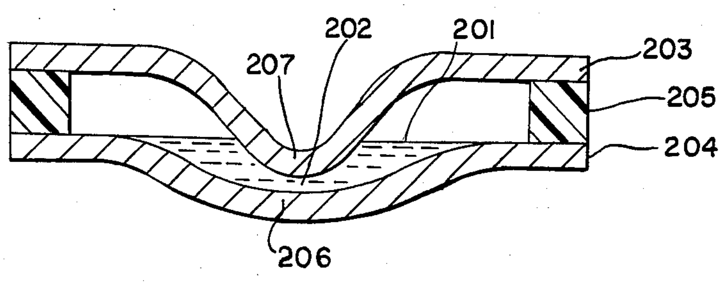
FIG. 6 is a sectional view showing another alternative embodiment of the invention.
Figure 7:
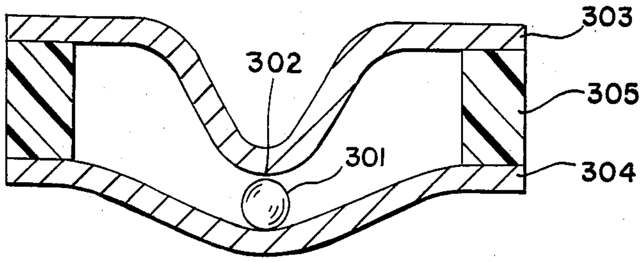
FIG. 7 is a sectional view similar to FIG. 6 and showing still another alternative embodiment.
Figure 8:
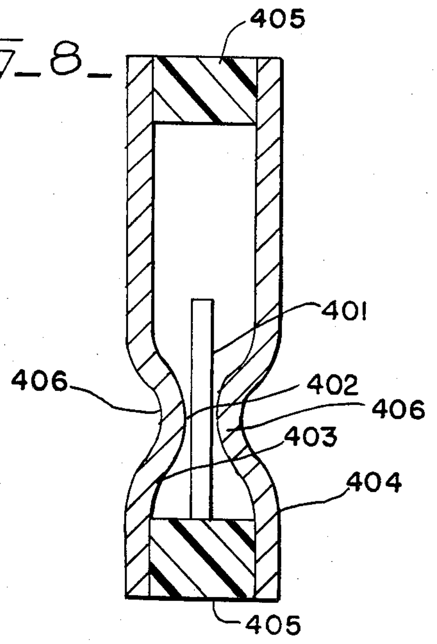
FIG. 8 is a sectional view similar to FIGS. 6 and 7 and showing still another alternative embodiment.

While FIGS. 2 to 5 show constructions wherein a gravity movable electrically conductive member is provided in an arrangement including two gap chambers, it should be understood that the invention also encompasses arrangements where a conductive or insulative member is gravity movable in a single chamber, as shown in FIGS. 6 to 8.

With regard first to FIG. 6, upper and lower electrically conductive electrodes 203 and 204 are held in spaced relation by an insulating spacer 205. The lower electrode 204 has its center portion 206 dished downwardly, and the center portion 207 of the upper electrode is also bent downwardly. The two portions 206 and 207 form a gap 202 between them, this gap being the shortest distance between the two electrodes. A high dielectric strength liquid 201 is placed in the space between the two electrodes, and in the position of the parts, shown in FIG. 6, the liquid 201 flows into the dished portion 206 and into the gap 202. The liquid 201 produces a high voltage breakdown level between the electrodes 203 and 204 in this position. When the parts are turned 90° or 180°, for example, from the position shown, the liquid flows out of the gap 202 and thus a lower breakdown level is produced. The amount of the liquid relative to the size of the space between the electrodes is preferably such that the liquid fills the gap when the structure is in the position shown but is clear of the gap when turned on its side or upside-down.

FIG. 7 shows an arrestor including electrodes 303 and 304 separated by a spacer 305, these parts being shaped similarly to the corresponding parts 203, 204 and 205. A conductive ball 301 is positioned in the space between the electrodes and in the position of the parts shown in FIG. 7, the ball rolls by gravity to the gap 302. The presence of the ball 301 creates a relatively low voltage gap; a higher voltage gap is formed when the structure is turned on its side or upside-down causing the ball to roll by gravity out of the gap 302.

FIG. 8 illustrates an arrestor including two electrodes 403 and 404 which are separated by spacers 405. The electrodes include deformed portions 406 which are bent toward each other and form a narrowed space or gap 402. A solid dielectric member 401 is movably mounted in the space between the two electrodes 403 and 404. In the position shown, the dielectric member 401 is moved by gravity into the narrowed gap 402 between the electrode portions 406 and thus creates a relatively high voltage breakdown level in the gap 402. When the structure is turned upside-down, the member 401 falls by gravity out of the narrowed gap 402 and thus creates a lower voltage breakdown level. The distance from the gap 402 to the upper spacer 405 should, of course, be greater than the length of the member 401 so that the member 401 will move entirely out of the gap when the arrestor is turned upside-down.

In the arrestors shown in FIGS. 6 to 8, one of the electrodes is connected to a voltage and current limiting valve block such as the member 131, and the other electrode is connected to a power lead. These arrestors may be provided with insulation and mounted generally as illustrated in FIGS. 2 to 5.

It will be apparent from the foregoing that a novel and useful surge arrestor has been provided. The arrestor has two breakdown voltage levels and a gravity movable member switches between the two levels, and it may be switched at will from one to the other simply by changing the physical orientation of the arrestor.

I claim:

1. A surge arrestor comprising at least first and second electrodes, spacer means connected to said electrodes and mounting said first and second electrodes to form a space therebetween, said electrodes having portions which are spaced relatively close to each other and form a gap therebetween, and gravity movable means in said space between said electrodes and movable by gravity to provide at least two different voltage breakdown levels in said gap.

2. A surge arrestor according to claim 1, wherein said movable means is electrically conductive.

3. A surge arrestor according to claim 1, wherein said movable means has a high dielectric strength.

4. A surge arrestor according to claim 1, wherein said movable means is a liquid.

5. A surge arrestor according to claim 1, wherein said movable means is a substantially round solid member.

6. A surge arrestor according to claim 1, wherein said movable means is an elongated solid member.

7. A surge arrestor according to claim 1, and further including a voltage and current limiting valve block connected to one of said electrodes.

8. A surge arrestor having two voltage breakdown levels, comprising:

(a) first and second outer electrodes having a space therebetween and made of an electrically conductive material;

(b) an electrical conductor mounted in said space between said electrodes, a first gap being formed between said conductor and said first electrode and a second gap being formed between said conductor and said second electrode; and (c) a gravity movable member adjacent said conductor and one of said first and second electrodes, said member being movable by gravity upon a change in the physical orientation of said arrestor between a normal position and an out-of-normal position, said member contacting both said conductor and said one of said first and second electrodes when said arrestor is in one said position and being moved by gravity out of contact with said conductor and said one of said first and second electrodes when said arrestor is in the other said position.

9. A surge arrestor comprising a pair of electrodes and a third electrode, means mounting said electrodes in spaced relation to form a first gap between said pair of electrodes normal and a second gap between said third electrode and one electrode of said pair of electrodes, and gravity movable means between said pair of electrodes, said movable means being movable by gravity to a first position where it forms a first value of conductance between said pair of electrodes, and being movable by gravity to a second position where it forms a second value of conductance between said pair of electrodes said means providing at least two different voltage breakdown levels.

10. A surge arrestor according to claim 9, wherein said pair of electrodes has first and second portions forming first and second gaps therebetween, said gravity movable means being movable between said first and second portions.

11. A surge arrestor comprising first and second electrodes and a gravity movable member, insulating means between said electrodes and forming an open space between said electrodes and said member being movably positioned in said space, said arrestor having a normal position wherein said first electrode is below said second electrode and said member rests on said first electrode, said first electrode having a curve thereon causing said member to be moved by gravity to a first portion of said first electrode when said arrestor is in said normal position, said second electrode having a first portion in contact with said member when said arrestor is in said normal position, said arrestor further having an out-of-normal position wherein said member is moved by gravity away from said first portions of said first and second electrodes and out of engagement with at least one of said electrodes.

* * * * *